(12) United States Patent
Schneider et al.

(10) Patent No.: US 11,407,438 B2
(45) Date of Patent: Aug. 9, 2022

(54) CLAMP LOAD ASSEMBLY FOR LOCK LEVER

(71) Applicant: STEERING SOLUTIONS IP HOLDING CORPORATION, Saginaw, MI (US)

(72) Inventors: Douglas M. Schneider, Frankenmuth, MI (US); Robert J. Smith, Midland, MI (US); Brandon M. McComb, Burton, MI (US); Matthew L. Messing, Saginaw, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 49 days.

(21) Appl. No.: 16/803,549

(22) Filed: Feb. 27, 2020

(65) Prior Publication Data

US 2020/0277001 A1  Sep. 3, 2020

Related U.S. Application Data

(60) Provisional application No. 62/811,876, filed on Feb. 28, 2019.

(51) Int. Cl.
*B62D 1/184* (2006.01)
*F16B 2/18* (2006.01)
*B62D 1/187* (2006.01)
*B62D 1/185* (2006.01)

(52) U.S. Cl.
CPC .............. *B62D 1/184* (2013.01); *F16B 2/185* (2013.01); *B62D 1/185* (2013.01); *B62D 1/187* (2013.01)

(58) Field of Classification Search
CPC ........ B62D 1/184; B62D 1/185; B62D 1/187; F16B 2/185
See application file for complete search history.

(56) References Cited

U.S. PATENT DOCUMENTS

| | | | | |
|---|---|---|---|---|
| 5,301,567 | A * | 4/1994 | Snell | B62D 1/184 280/775 |
| 5,461,937 | A * | 10/1995 | Cymbal | B62D 1/184 280/775 |
| 5,570,610 | A * | 11/1996 | Cymbal | B62D 1/184 74/493 |
| 9,168,945 | B2 * | 10/2015 | Hiesse | B62D 1/187 |
| 9,278,706 | B2 * | 3/2016 | Tinnin | B62D 1/184 |
| 9,663,134 | B2 * | 5/2017 | Imagaki | B62D 1/184 |

(Continued)

FOREIGN PATENT DOCUMENTS

JP  2014159281 A  *  9/2014
JP  2016215686 A  *  12/2016

*Primary Examiner* — Laura Freedman
(74) *Attorney, Agent, or Firm* — Dickinson Wright PLLC

(57) ABSTRACT

A lever assembly for a steering column includes a rotatable lock lever. The lever assembly also includes a bolt operatively coupled to the rotatable lock lever and rotated therewith. The lever assembly further includes a clamp load assembly operatively coupled to the bolt. The clamp load assembly includes an assist cam having a cam profile defined by at least one ramp. The clamp load assembly also includes an assist follower having a follower profile in contact with the cam profile. The clamp load assembly further includes an assist spring disposed between the assist follower and a column structure, the assist spring biasing the assist follower into contact with the assist cam.

6 Claims, 14 Drawing Sheets

(56) References Cited

U.S. PATENT DOCUMENTS

| | | | |
|---|---|---|---|
| 9,738,304 B2 * | 8/2017 | Kwon | B62D 1/184 |
| 10,246,118 B2 * | 4/2019 | Baumeister | B62D 1/19 |
| 10,913,483 B2 * | 2/2021 | Huber | B62D 1/195 |

* cited by examiner

CLAMP LOAD ASSEMBLY FOR LOCK LEVER

CROSS-REFERENCE TO RELATED APPLICATION

This application claims priority to U.S. Provisional Patent Application No. 62/811,876, filed Feb. 28, 2019, the disclosure of which is incorporated by reference herein in its entirety.

BACKGROUND OF THE DISCLOSURE

On a manual rake and telescope column, various structures and methods may be utilized to increase rake and/or telescope holding load when the clamp mechanism is closed (lever locked). For example, "saw teeth" that engage when the lever is locked (also referred to as a positive lock) and disengage when the lever is unlocked. The limitations with this approach include that: 1) the same device cannot provide both rake and telescope holding load, 2) there are multiple rake and telescope positions where the lever cannot be locked, and 3) the device only prevents rake or telescope travel in one direction.

Another design includes adding friction by setting the clamp mechanism tighter at assembly, therefore increasing the clamp load that is generated when the lever is locked. This approach is limited by lever effort and durability to wear. To sufficiently increase clamp load, the lever effort is exceeded or increased wear is observed in the clamp mechanism.

A third design uses a torsion spring around the rake bolt. The spring is loaded when the lever is unlocked and provides torsional assist when the lever is locked. This allows the clamp mechanism to be set slightly higher during assembly without increasing the lever locking load. Additionally, it provides dampening to minimize or eliminate "lever slap" in the unlock direction. The limitations associated with this approach include: 1) spring provides the maximum amount of assist at the very beginning of the locking cycle, 2) packaging space required, and 3) tuning and timing of the assist is limited, maximum assist is needed closer to the end of the locking cycle where the torsion spring has reduced assist.

SUMMARY OF THE DISCLOSURE

According to one aspect of the disclosure, a lever assembly for a steering column includes a rotatable lock lever. The lever assembly also includes a bolt operatively coupled to the rotatable lock lever and rotated therewith. The lever assembly further includes a clamp load assembly operatively coupled to the bolt. The clamp load assembly includes an assist cam having a cam profile defined by at least one ramp. The clamp load assembly also includes an assist follower having a follower profile in contact with the cam profile. The clamp load assembly further includes an assist spring disposed between the assist follower and a column structure, the assist spring biasing the assist follower into contact with the assist cam.

According to another aspect of the disclosure, a clamp load assembly for a steering column lock lever assembly includes a cam having a cam profile. The clamp load assembly also includes a follower having a follower profile in contact with the cam profile. The clamp load assembly further includes a linear assist spring in contact with the follower and biasing the follower into contact with the cam during movement between an unlocked condition and a locked condition of the clamp load assembly, wherein the cam, the follower and the linear assist spring are an axially stacked assembly.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Referring now to the Figures, where the invention will be described with reference to specific embodiments, without limiting same, it is to be understood that the disclosed embodiments are merely illustrative of the present disclosure that may be embodied in various and alternative forms. Various elements of the disclosed embodiments may be combined or omitted to form further embodiments of the present disclosure. The Figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
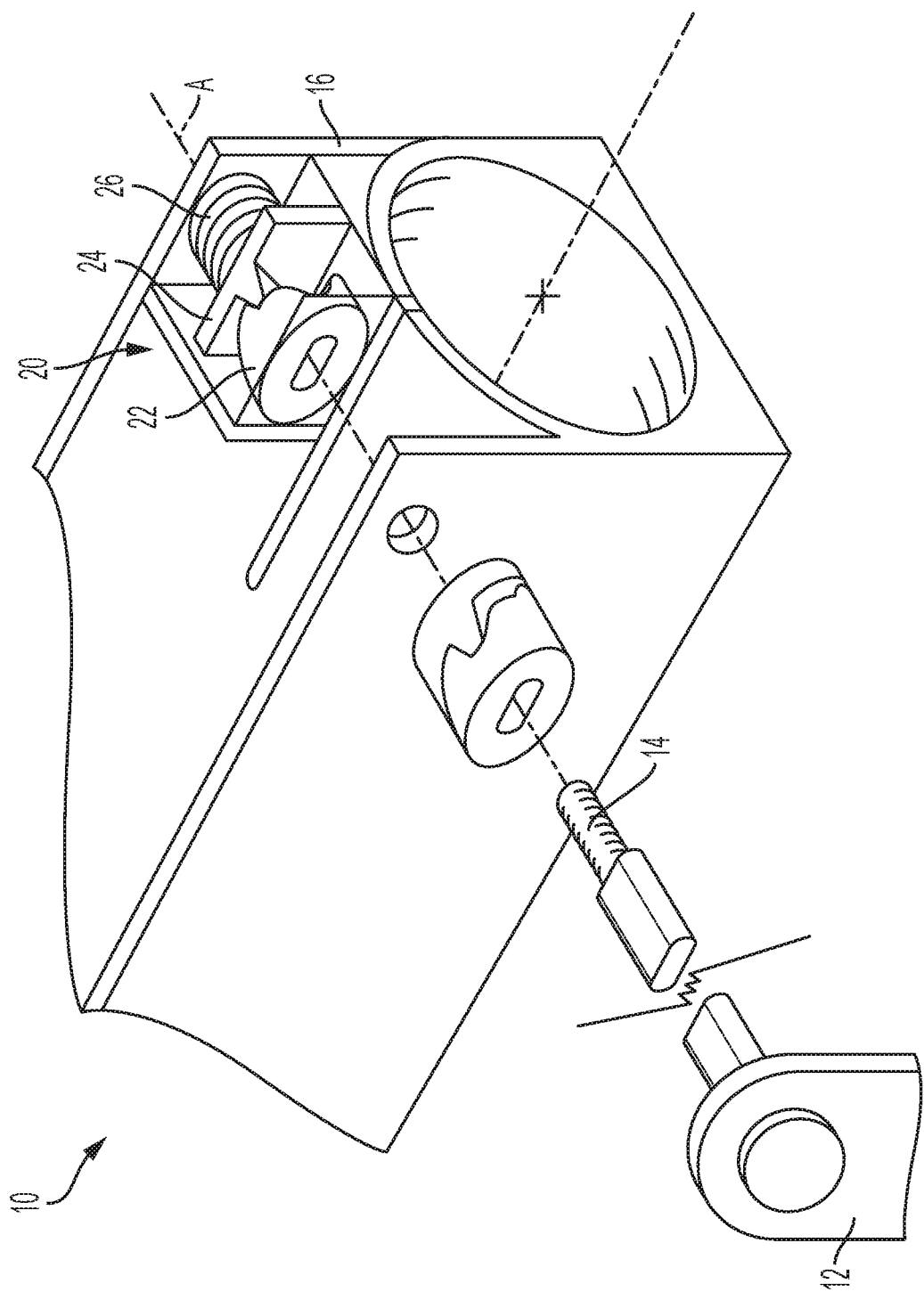
FIG. 1 is a perspective view of a lock lever assembly for a steering column.
Figure 2:
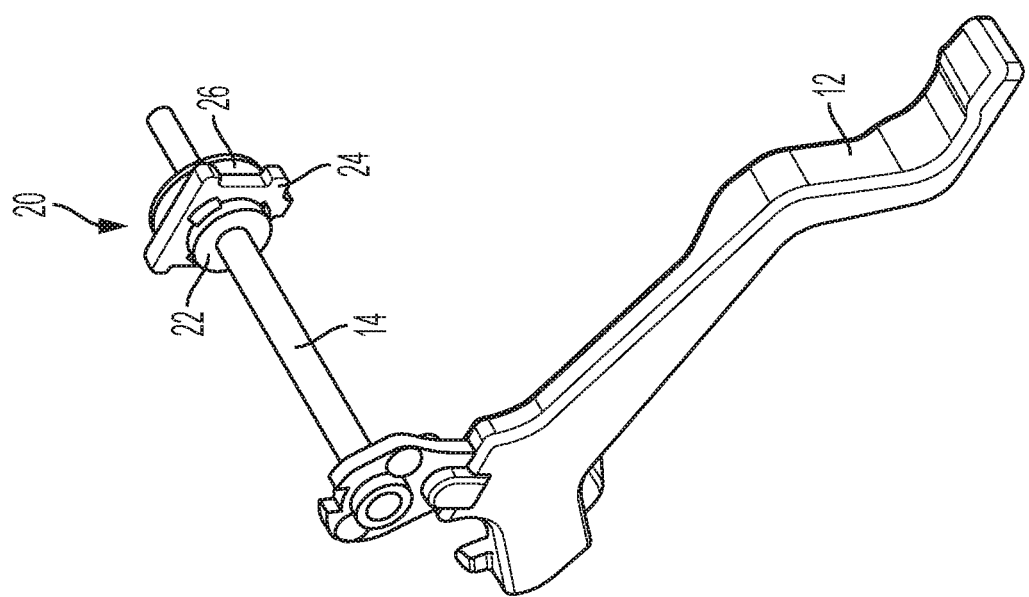
FIG. 2 is a perspective view of a clamp load assembly for the lock lever assembly.

Referring to FIGS. 1 and 2, a lock lever assembly is illustrated and generally referenced with numeral 10. The lock lever assembly 10 is used to selectively lock and unlock steering column components to facilitate manual adjustment of a steering column assembly (e.g., rake and/or telescope adjustment). The lock lever assembly 10 includes a rotatable lever 12 that is accessible to an operator. The lever 12 is coupled to a bolt 14 that extends through a steering column structure, such as a lower jacket 16, for example, with the lever 12 being rotatable about a longitudinal axis A of the bolt. The lock lever assembly 10 also includes a clamp load assembly 20 that is moveable between various positions to selectively lock and unlock the steering column assembly for adjustment purposes.

Figure 3:
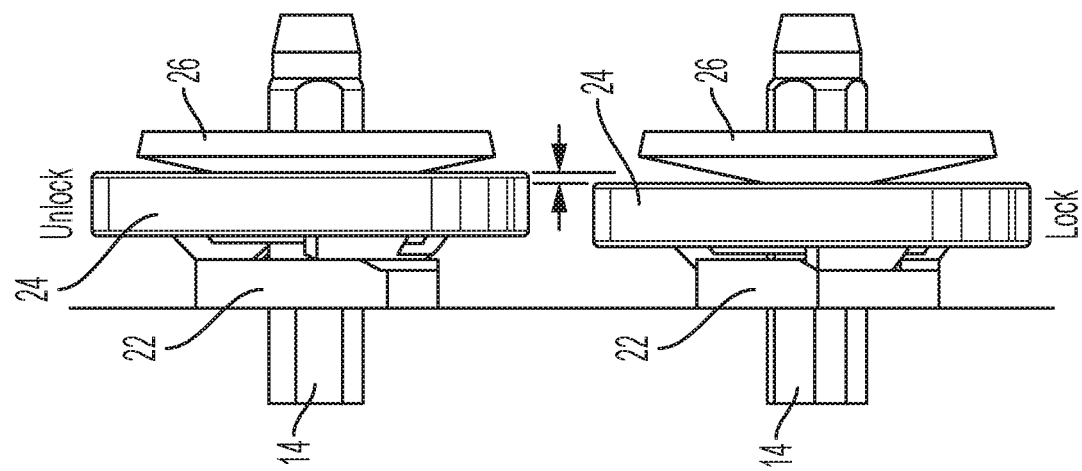
FIG. 3 is a side view of a clamp load assembly of the lock lever assembly in an unlocked condition and a locked condition.

Referring now to FIG. 3, with continued reference to FIGS. 1 and 2, the clamp load assembly 20 includes an assist cam 22, an assist follower 24 and an assist spring 26. The clamp load assembly 20 is at least partially contained within a jacket of the steering column assembly, such as the lower jacket 16 (FIG. 1). When the lock lever 12 is actuated from the locked to the unlocked positon, the bolt 14 drives the assist cam 22, which pushes the assist follower 24 along the bolt axis A, thereby compressing the assist spring 26. The lower jacket 16 prevents the assist cam 22 and the assist spring 26 from translating and the assist follower 24 from rotating.

The assist follower 24 is in contact with the assist spring 26 on a first side of the assist follower 24. On an opposite side of the assist follower 24 is a lobe 28. Although the assist follower 24 is shown in the illustrated embodiments with a single lobe 28, it is to be appreciated that multiple lobes may be included. The lobe(s) 28 react against a ramp profile of the assist cam 22.

Referring now to FIGS. 4-11, the figures illustrate progressive movement of the clamp load assembly 20 from the unlocked position to the locked position during rotation of the lever 12. In some embodiments, each subsequent figure within FIGS. 4-11 represents rotation of the lever 12 in 5 degree increments.

Figure 4:
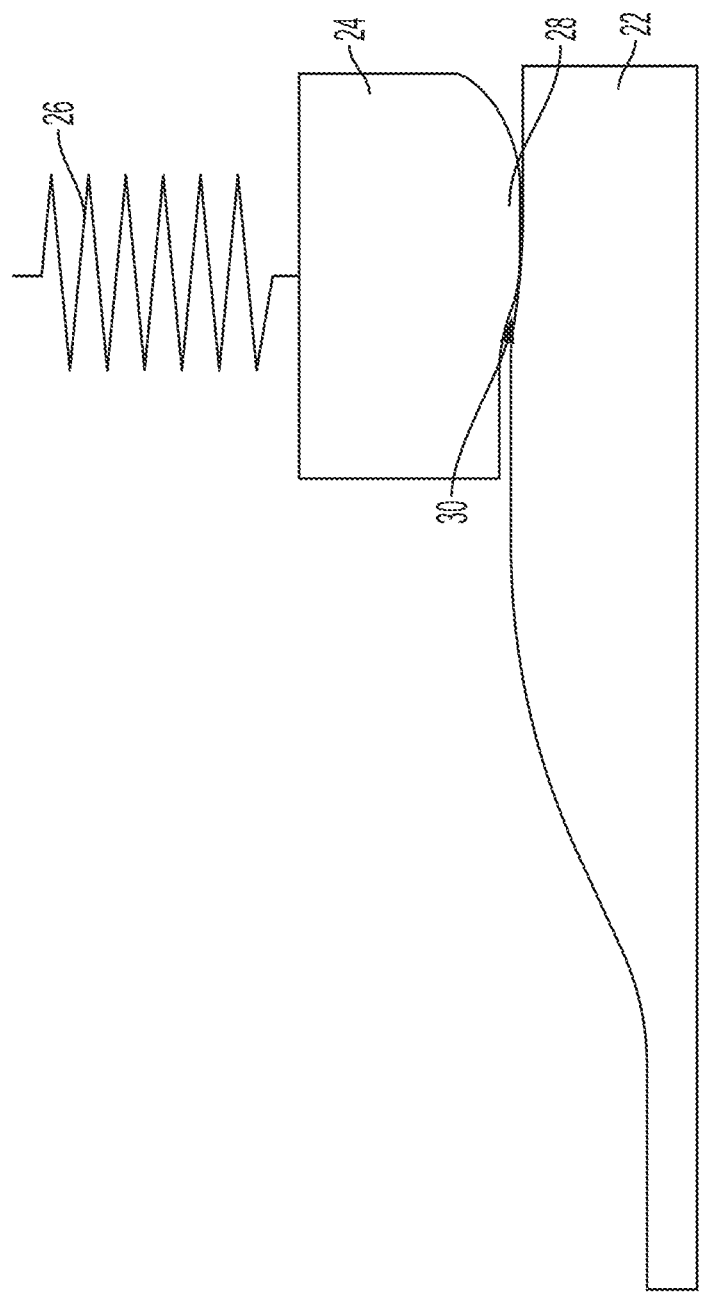
FIGS. 4-11 are schematic illustrations of the clamp load assembly in various positions during rotation from an unlocked condition to a locked condition.
Figure 5:
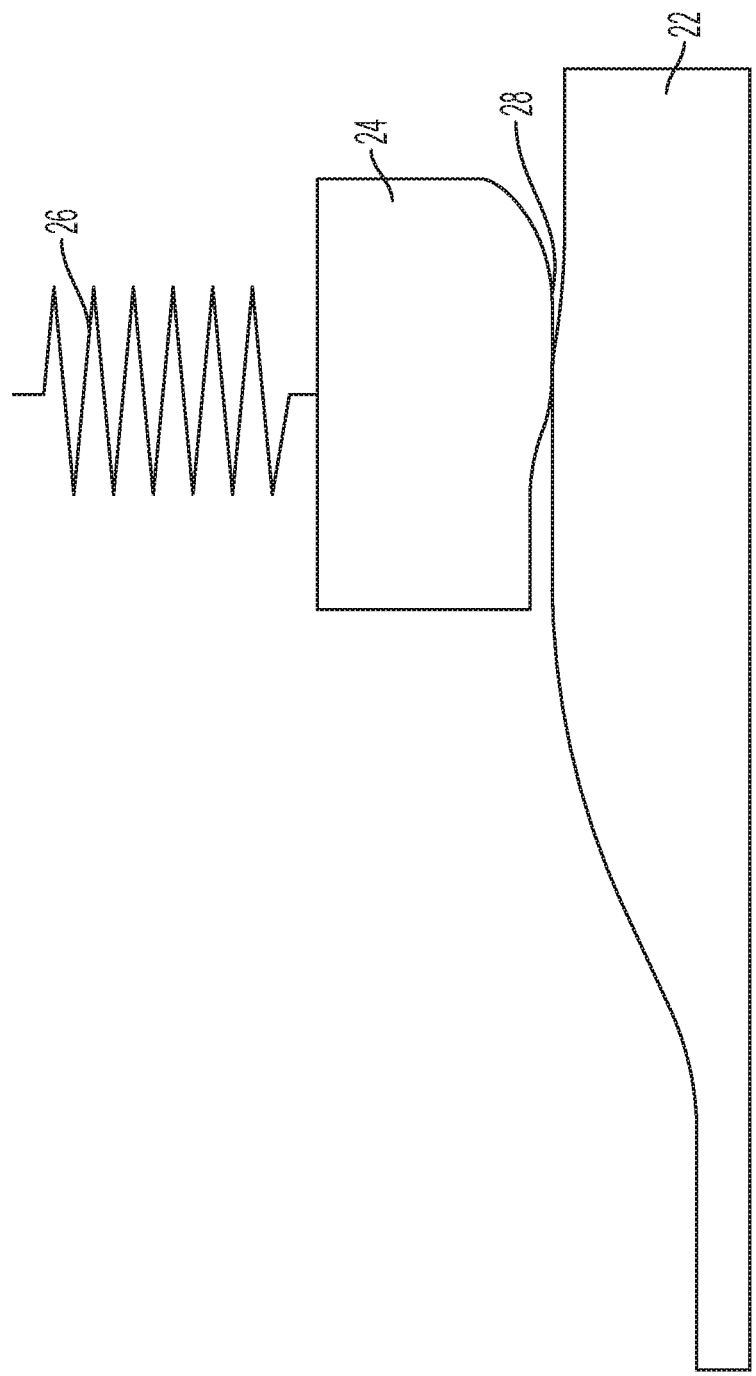
Figure 6:
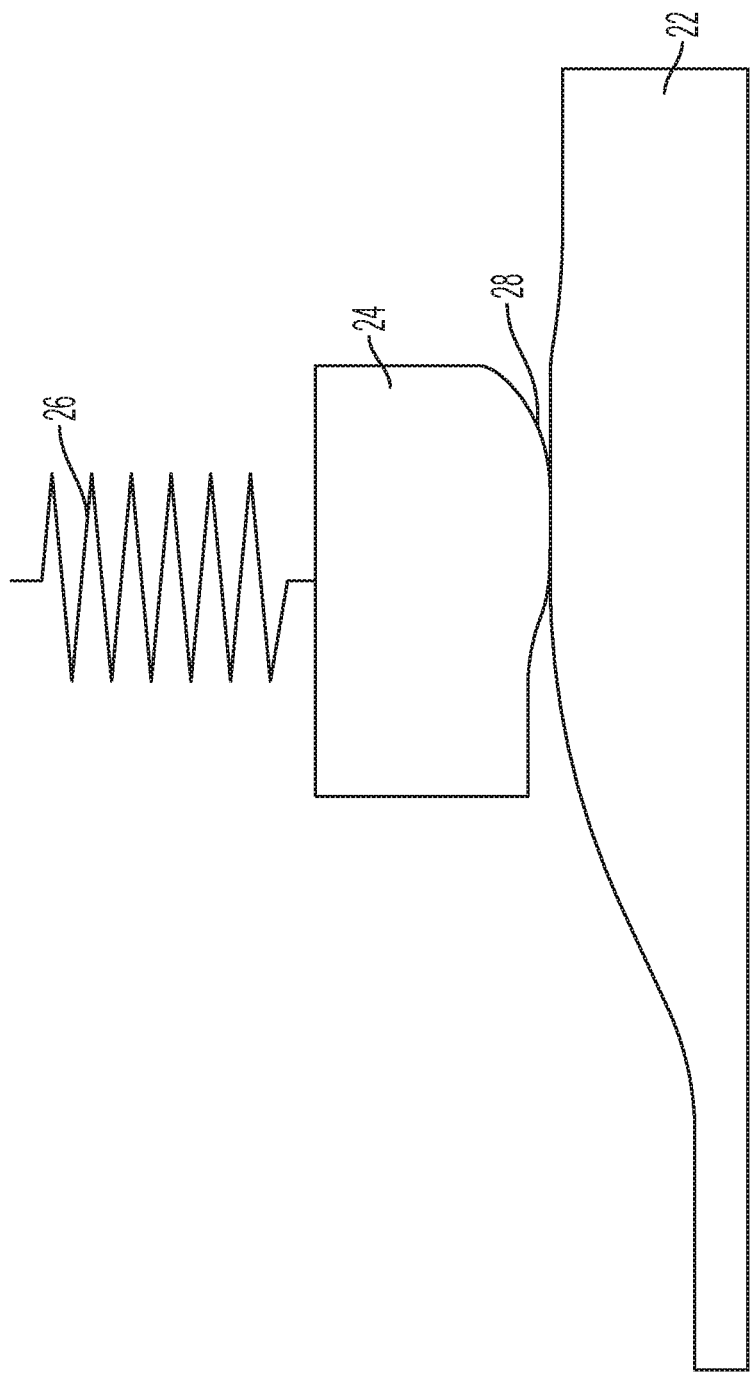
Figure 7:
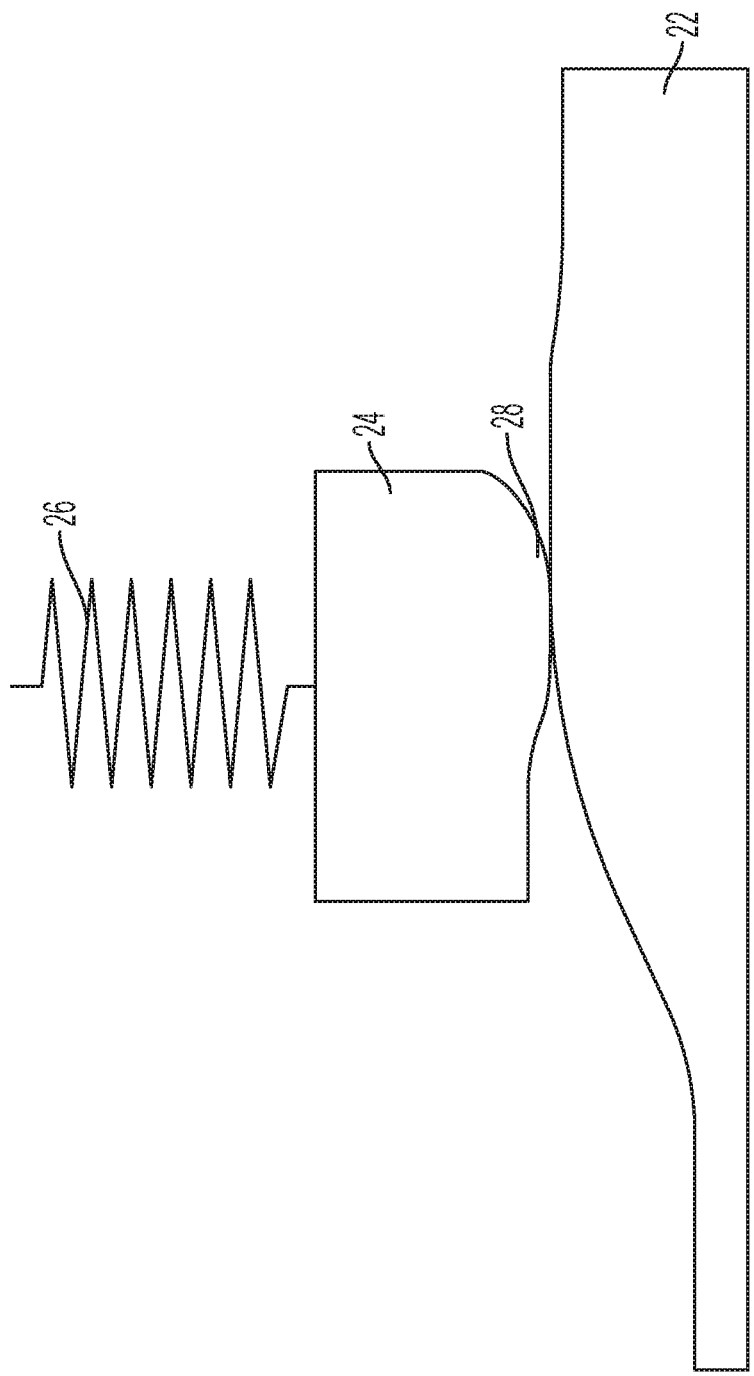
Figure 8:
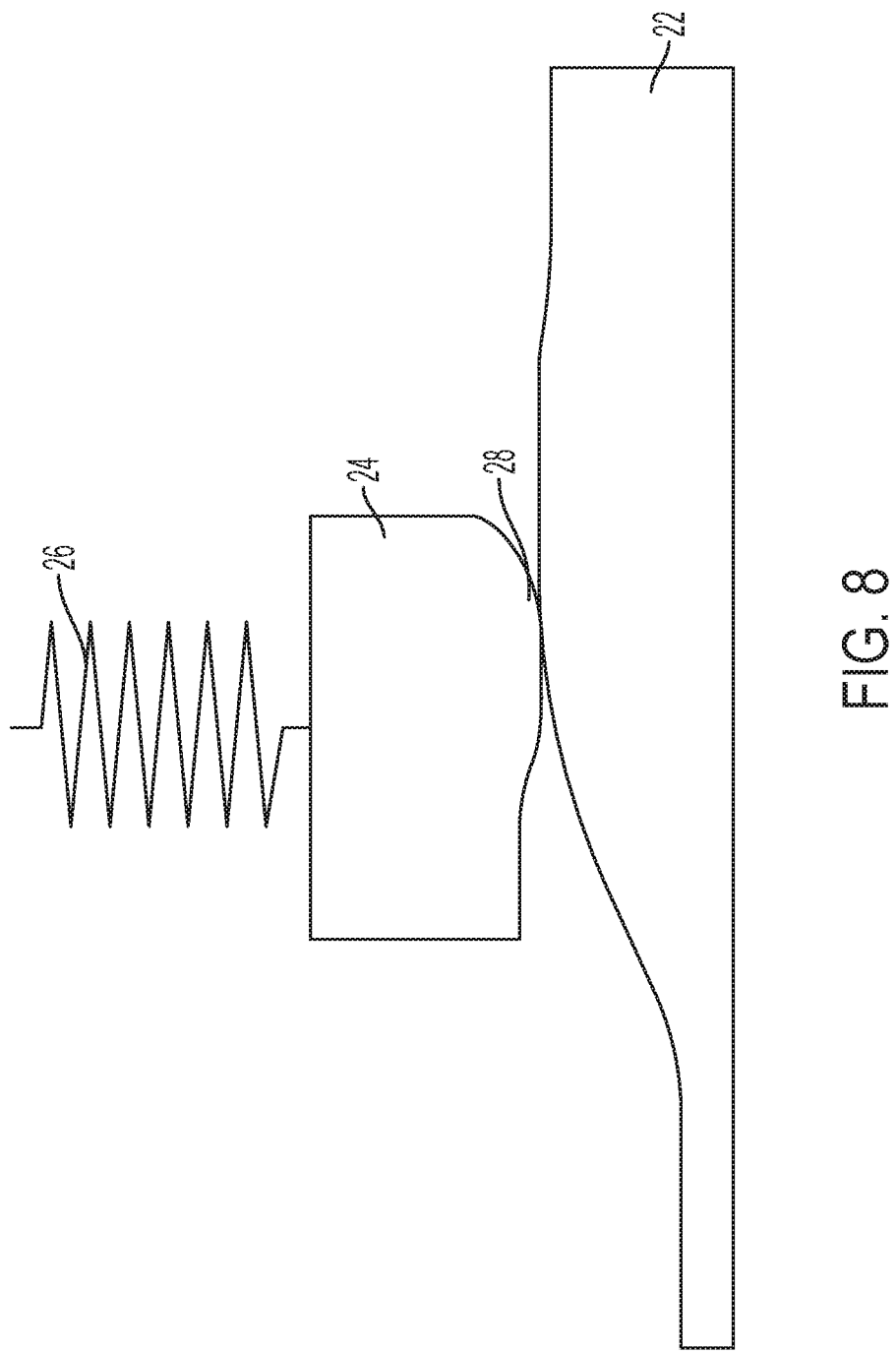
Figure 9:
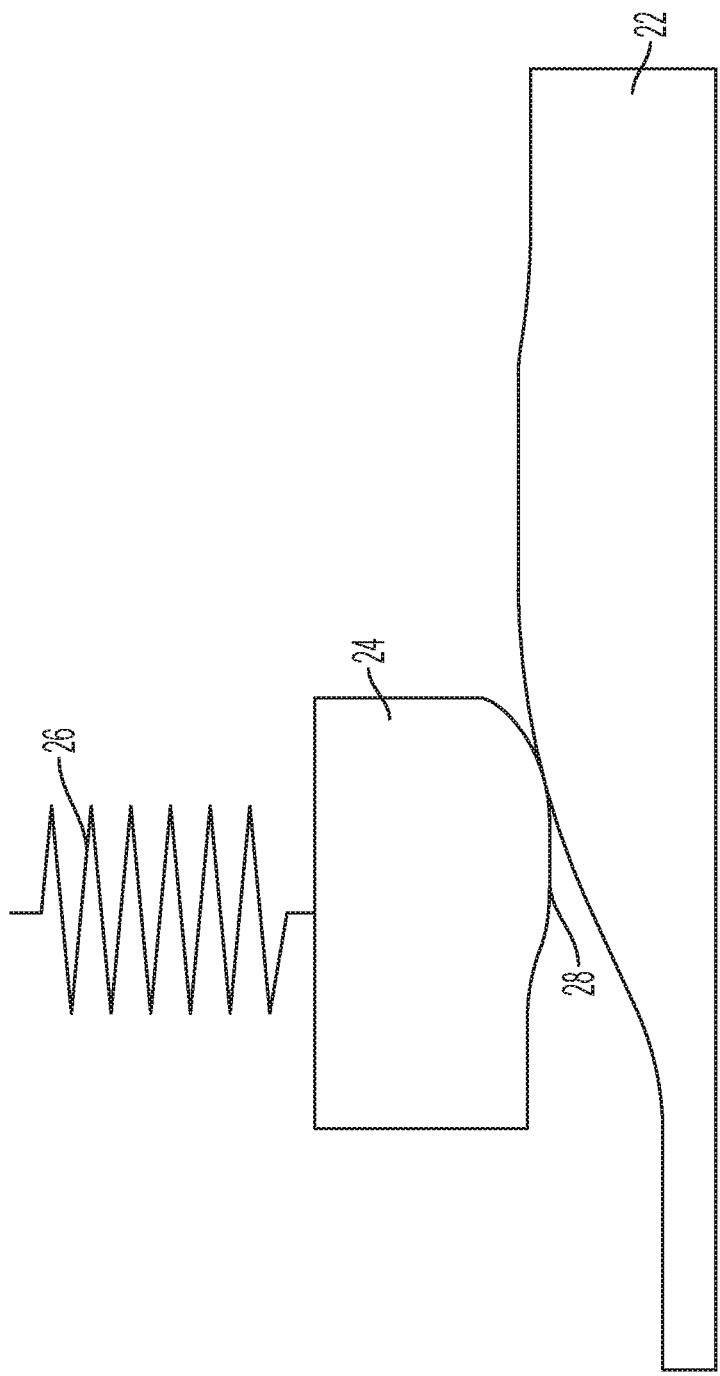
Figure 10:
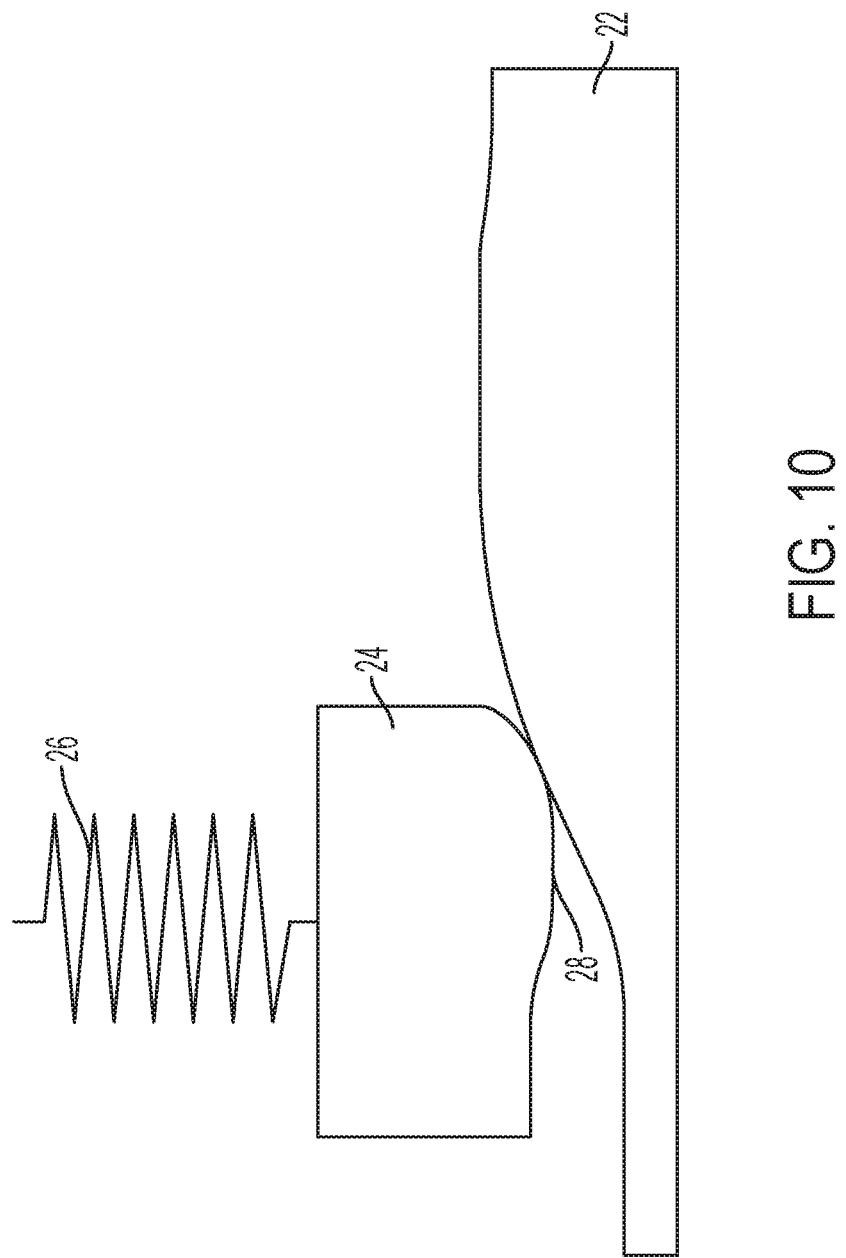
Figure 11:
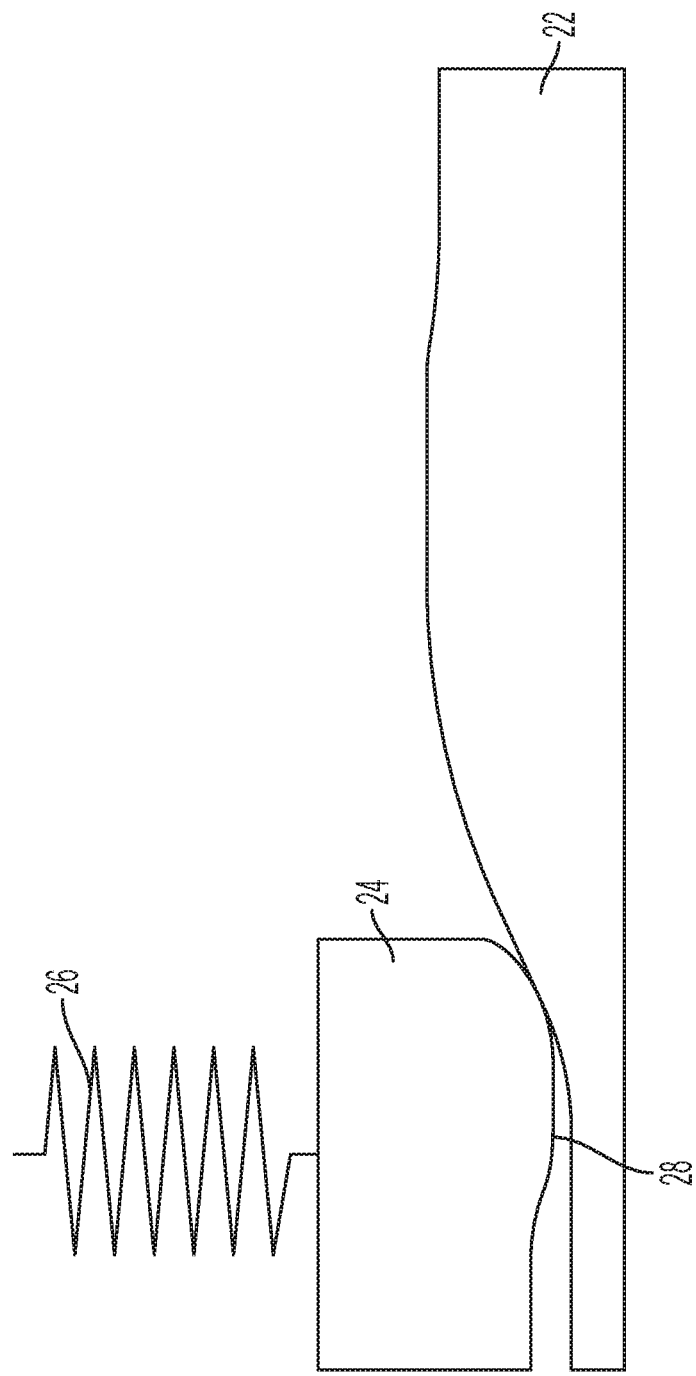

In the full unlock position shown in FIG. 4, the lobe 28 of the assist follower 24 is positioned within a detent 30 of the assist cam 22. In this position, compression from the assist spring 26 is holding the assist cam 22 and the lever 12 in the unlocked position. FIG. 5 shows the lever 12 rotated away from the unlocked position toward the locked position. Here, the lobe 28 of the assist follower 24 is lifted out of the detent 30 of the assist cam 22 to place the assist spring 26 in further compression (e.g., maximum compression). FIG. 6 shows the lever 12 further rotated away from the unlocked position. In this position, the assist spring 26 remains in compression, the bolt clamp load begins to increase and no lever adjustment assist load is provided yet. FIG. 7 illustrates the lever 12 rotated further away from the unlocked position. In this position, the assist spring 26 pushes the assist follower 24 into the assist cam 22. In particular, the assist follower 24 begins to travel down the ramp profile of the assist cam 22, the assist spring 26 begins to decompress, the bolt clamp load continues to build, and the assist load begins to increase. FIG. 8 shows the lever 12 further rotated from the unlocked position. In this position, the assist follower 24 continues to travel down the ramp profile of the assist cam 22, the spring continues to decompress, and the bolt clamp load and lever assist load continue to build and are both near peak values. FIG. 9 illustrates the lever 12 rotated further away from the unlocked position. In this position, the assist follower 24 continues to travel down the ramp profile of the assist cam 22, the spring continues to decompress, and the bolt clamp load and lever assist load are both at their peak values. FIG. 10 illustrates the lever 12 rotated further away from the unlocked position. In this position, the assist follower 24 continues to travel down the ramp profile of the assist cam 22, the spring continues to decompress, and the bolt clamp load and lever assist load are decreasing. FIG. 11 illustrates the lever 12 in the full locked position. In this position, the assist follower 24 remains in contact with the ramp profile of the assist cam 22 and the assist spring 26 is minimally compressed to prevent the clamp load assembly 20 from being loose and rattling.

The assist cam 22 drives torque in the bolt 14 in the lock direction due to the torque provided by the lobe 28 of the assist follower 24 travelling off the ramp of the assist cam 22. With this added torque, the clamp load assembly 20 can be set tighter at assembly without increasing the lever effort required from the operator to lock the steering column. The net result is a significant increase in clamp load without increasing lever effort, or even reducing such effort.

The clamp load assembly 20 maintains the same advantages as a torsion spring assist mechanism, but provides several advantages. For example, the assist torque can be tuned to provide the assist at the most optimal lever angle during the locking action, the assist cam provides a detent in the unlock positon for added ergonomic feel, and the amount of load can be adjusted at any lever position by modifying the clamp profile, which is not feasible with a torsion spring. Additionally, much smaller packaging size is achieved when compared to the torsion spring design.

Figure 12:
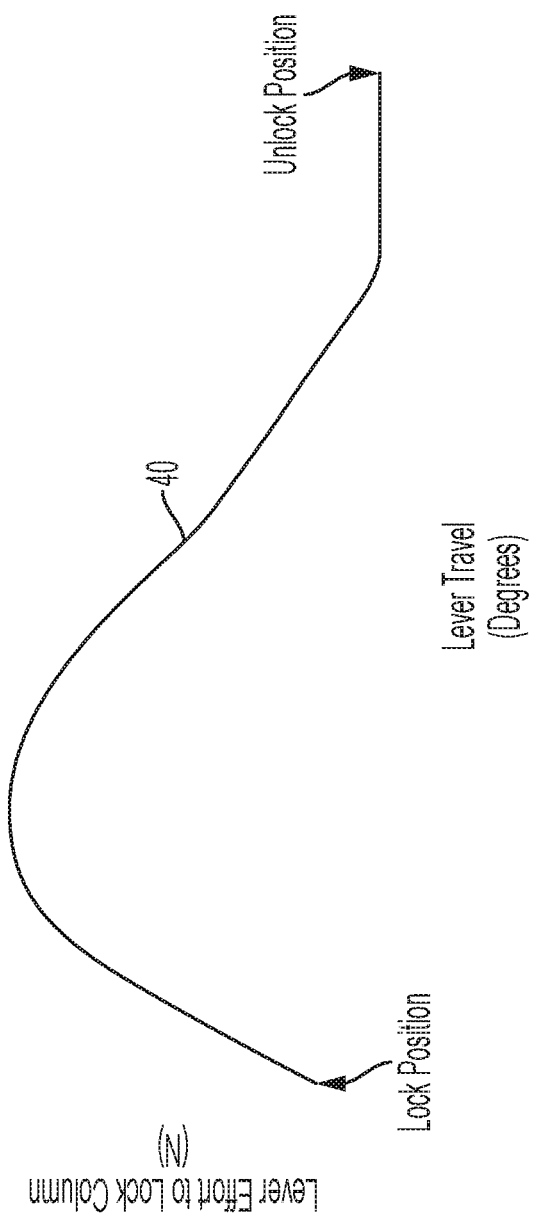
FIGS. 12-15 are various graphical representations of lever effort as a function of position of the clamp load assembly.
Figure 13:
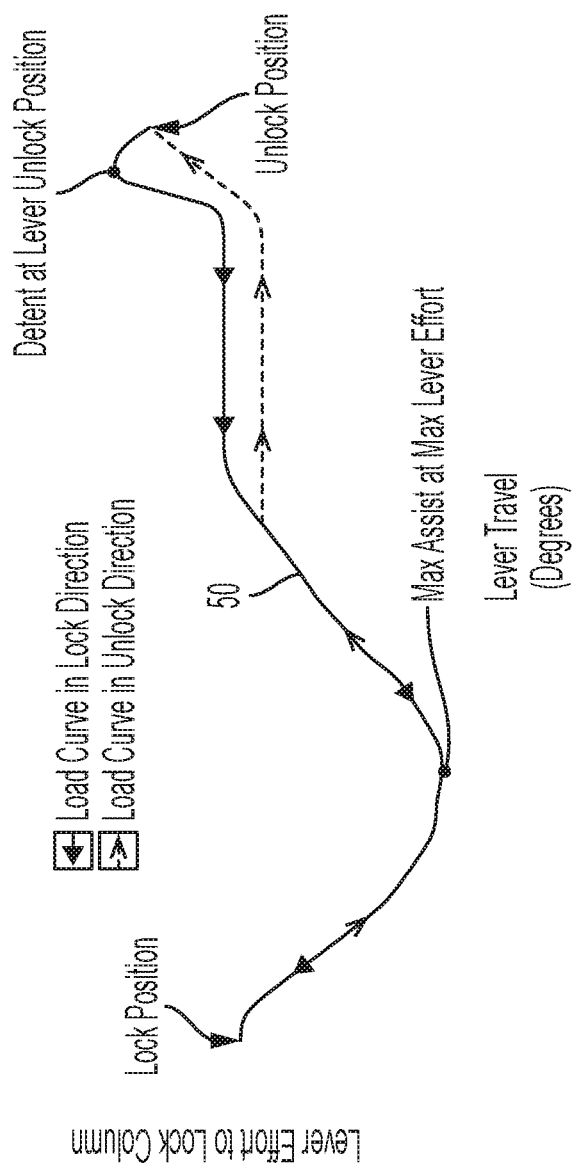

Referring now to FIG. 12, the lever effort curve associated with locking the column without the clamp load assembly is shown and referred to with numeral 40. The peak clamp load requires a lever effort that is well above a maximum effort allowed for many applications. FIG. 13 shows the lever effort assist curve 50 provided by the clamp load assembly described herein. It is noted that positive lever effort values shown on the graph are the detent that holds the lever in the unlock position that the operator needs to overcome in order to lock the steering column.

Figure 14:
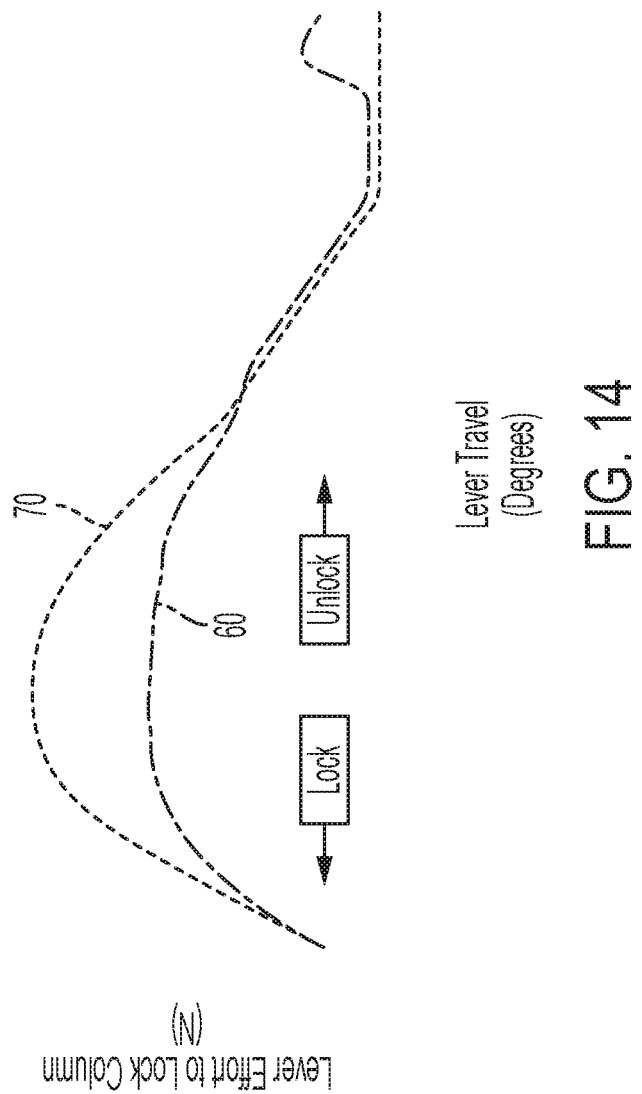

FIG. 14 shows the lever effort curve 60 to lock the steering column with the clamp load assembly described herein. The clamp load remains high when the peak lever effort is set to a predetermined load at assembly. The retention load (detent at unlock position) is provided by the design of the assist cam profile. Also shown is the benefit of tuning the device to provide the maximum amount of assist where the maximum lever effort occurs. FIG. 14 also compares the lever effort needed to lock the steering column and generate sufficient clamp load with and without the clamp load assembly. The graph shows that the lever effort 70 without the clamp load assembly would exceed most lever effort requirements.

Figure 15:
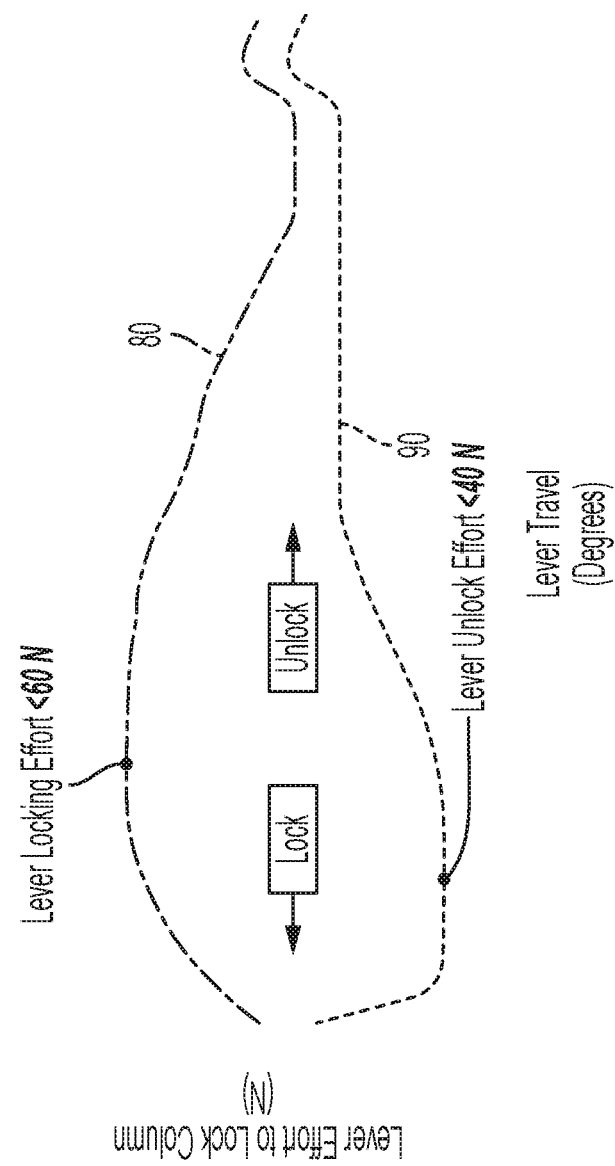

FIG. 15 illustrates both lock 80 and unlock 90 load curves with the clamp load assembly. It shows an added benefit of the assembly. Due to tuning the assist load to occur near the end of the lever locking cycle—when the steering column is unlocked the assist spring has to immediately be compressed—this spring compression dampens the unlock travel of the lock lever and eliminates lever slap.

The assembly described herein combines two ramp profiles (i.e., assist cam and assist follower) with a linear spring to create torque that is used to increase the clamp load of the overall clamp mechanism. Both rake and telescope holding loads are higher when compared to prior designs and the lever can always be locked in any rake or telescope position. There is no need to set the lever effort any higher during assembly. Importantly, setting the assist spring rate and the profiles of the assist cam and the assist follower, the clamp load assembly can be tuned to provide the maximum amount of assist where the maximum lever effort occurs in the lever travel cycle.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:
1. A lever assembly for a steering column comprising:
a rotatable lock lever;
a bolt operatively coupled to the rotatable lock lever and rotated therewith; and a clamp load assembly operatively coupled to the bolt, the clamp load assembly comprising:
  an assist cam having a cam profile defined by at least one ramp, wherein at least a portion of the cam profile is curved;
  an assist follower having a follower profile in contact with the cam profile, wherein the follower profile of the assist follower comprises at least one lobe having curvature, wherein the curved portion of the cam profile is non-linear in a direction of travel of the follower profile therealong; and
  an assist spring disposed between the assist follower and a column structure, the assist spring biasing the assist follower into contact with the assist cam,
  wherein the column structure is a lower jacket, the lower jacket preventing rotation of the assist follower.

2. The lever assembly of claim 1, wherein the assist spring is a linear spring.

3. The lever assembly of claim 2, wherein the assist spring is a coil spring.

4. The lever assembly of claim 1, wherein the lower jacket prevents translation of the assist cam in a direction along a longitudinal axis of the bolt.

5. The lever assembly of claim 1, wherein the assist cam includes a detent.

6. The lever assembly of claim 5, wherein the at least one lobe is disposed within the detent of the assist cam in a fully unlocked position of the clamp load assembly.

\* \* \* \* \*